(12) United States Patent
Bradshaw et al.

(10) Patent No.: US 11,036,593 B2
(45) Date of Patent: Jun. 15, 2021

(54) PERFORMING DATA RESTORE OPERATIONS IN MEMORY

(71) Applicant: Micron Technology, Inc., Boise, ID (US)

(72) Inventors: Samuel E. Bradshaw, Sacramento, CA (US); Justin M. Eno, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 145 days.

(21) Appl. No.: 16/423,574

(22) Filed: May 28, 2019

(65) Prior Publication Data
US 2019/0278670 A1    Sep. 12, 2019

Related U.S. Application Data

(63) Continuation of application No. 15/670,544, filed on Aug. 7, 2017, now Pat. No. 10,445,195.

(51) Int. Cl.
*G06F 11/07*      (2006.01)
*G06F 11/14*      (2006.01)
(Continued)

(52) U.S. Cl.
CPC ........ *G06F 11/1469* (2013.01); *G06F 1/3225* (2013.01); *G06F 3/064* (2013.01);
(Continued)

(58) Field of Classification Search
CPC ............. G06F 11/0727; G06F 11/0754; G06F 11/076; G06F 11/1666
(Continued)

(56) References Cited

U.S. PATENT DOCUMENTS 7,916,421 B1     3/2011  Likanen et al.
2004/0085849 A1* 5/2004  Myoung ............. G06F 12/0246
                                                365/232
(Continued)

FOREIGN PATENT DOCUMENTS

KR    20100039181 A    4/2010
WO      2016023003 A2   2/2016

OTHER PUBLICATIONS

U.S. Appl. No. 15/472,957, entitled, "Selective Error Rate Information for Multidimensional Memory," filed Mar. 29, 2017, 33 pp.
(Continued)

*Primary Examiner* — Chae M Ko
(74) *Attorney, Agent, or Firm* — Brooks, Cameron & Huebsch, PLLC

(57) ABSTRACT

The present disclosure includes apparatuses and methods for performing data restore operations in memory. An embodiment includes a memory, and a controller configured to perform a data restore operation on data stored in the memory using a first table and a second table stored in the controller, wherein the first table includes a current mapping of the data stored in the memory that is based on a previous assessment of previous error rates associated with the data stored in the memory, and the second table includes a new mapping of the data stored in the memory that is based on a current assessment of current error rates associated with the data stored in the memory.

17 Claims, 8 Drawing Sheets

(51) Int. Cl.
  *G06F 3/06* (2006.01)
  *G06F 1/3225* (2019.01)
  *G06F 11/10* (2006.01)
  *G06F 11/16* (2006.01)

(52) U.S. Cl.
  CPC .......... *G06F 3/0616* (2013.01); *G06F 3/0634* (2013.01); *G06F 3/0679* (2013.01); *G06F 11/1048* (2013.01); *G06F 3/0658* (2013.01); *G06F 11/1441* (2013.01); *G06F 11/1666* (2013.01); *G06F 2201/82* (2013.01); *G06F 2201/84* (2013.01)

(58) Field of Classification Search
  USPC ........................................................ 714/6.13
  See application file for complete search history.

(56) References Cited

U.S. PATENT DOCUMENTS

| | | |
|---|---|---|
| 2005/0204187 A1 | 9/2005 | Lee |
| 2008/0082736 A1 | 4/2008 | Chow |
| 2010/0082890 A1* | 4/2010 | Heo ..................... G06F 9/4406 711/103 |
| 2010/0153620 A1 | 6/2010 | McKean |
| 2010/0332894 A1 | 12/2010 | Bowers et al. |
| 2013/0061087 A1 | 3/2013 | Kopylovitz |
| 2014/0376320 A1 | 12/2014 | Loh et al. |
| 2015/0234719 A1 | 8/2015 | Coronado |
| 2016/0124642 A1 | 5/2016 | Kim |
| 2016/0147623 A1 | 5/2016 | Ping |
| 2016/0170672 A1 | 6/2016 | Li et al. |
| 2016/0170898 A1 | 6/2016 | Lee |
| 2017/0091115 A1 | 3/2017 | Xiao |
| 2017/0132099 A1* | 5/2017 | Li ....................... G06F 11/2094 |
| 2017/0132125 A1 | 5/2017 | Cai |
| 2017/0220273 A1 | 8/2017 | Yang |
| 2017/0300422 A1 | 10/2017 | Szubbocsev |
| 2018/0095680 A1* | 4/2018 | Peterson ............... G06F 3/0619 |
| 2018/0143902 A1 | 5/2018 | Hong |
| 2018/0189144 A1 | 7/2018 | Song |
| 2018/0239547 A1 | 8/2018 | Inbar |
| 2018/0373642 A1 | 12/2018 | Yang |

OTHER PUBLICATIONS

International Search Report and Written Opinion from related international application No. PCT/US2018/045343, dated Nov. 27, 2018, 14 pages.

European Search Report from related European Patent Application No. 18844941.7. dated Mar. 24, 2021, 11 pages.

* cited by examiner

PERFORMING DATA RESTORE OPERATIONS IN MEMORY

PRIORITY INFORMATION

This application is a Continuation of U.S. application Ser. No. 15/670,544, filed on Aug. 7, 2017, the contents of which are incorporated herein by reference.

TECHNICAL FIELD

The present disclosure relates generally to semiconductor memory and methods, and more particularly, to performing data restore operations in memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), 3D Phase Change Material and Switch (PCMS), resistive random access memory (RRAM), magnetic random access memory (MRAM), and programmable conductive memory, among others.

Memory devices can be combined together to form a solid state drive (SSD). An SSD can include non-volatile memory (e.g., 3D PCMS, NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Memory cells in an array architecture can be programmed to a target (e.g., desired) data state. For example, a single level cell (SLC) can be programmed to a targeted one of two different data states, which can be represented by the binary units 1 or 0. Some memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one bit).

Various internal and/or external mechanisms, however, may cause an error to occur when the state of a memory cell is sensed (e.g., read). For example, such mechanisms may cause memory cells to be sensed to be in a state other than the target state (e.g., a different data state than the data state to which the cell was programmed). This may reduce the quality of the data stored in the memory, which may decrease the lifetime of the memory and/or cause the memory to fail, if corrective actions are not taken.

Error detection and correction schemes such as, for instance, error correction code (ECC) schemes and/or redundant array independent disc (RAID) schemes, can be utilized to correct such errors. However, the capabilities of such schemes may be limited. For instance, such schemes may only be capable of detecting and correcting a certain (e.g., finite) quantity (e.g., number or distribution) of erroneous data; if this limit is exceeded, the erroneous data may not be correctable, and may become corrupted and/or lost.

DETAILED DESCRIPTION

Figure 1:
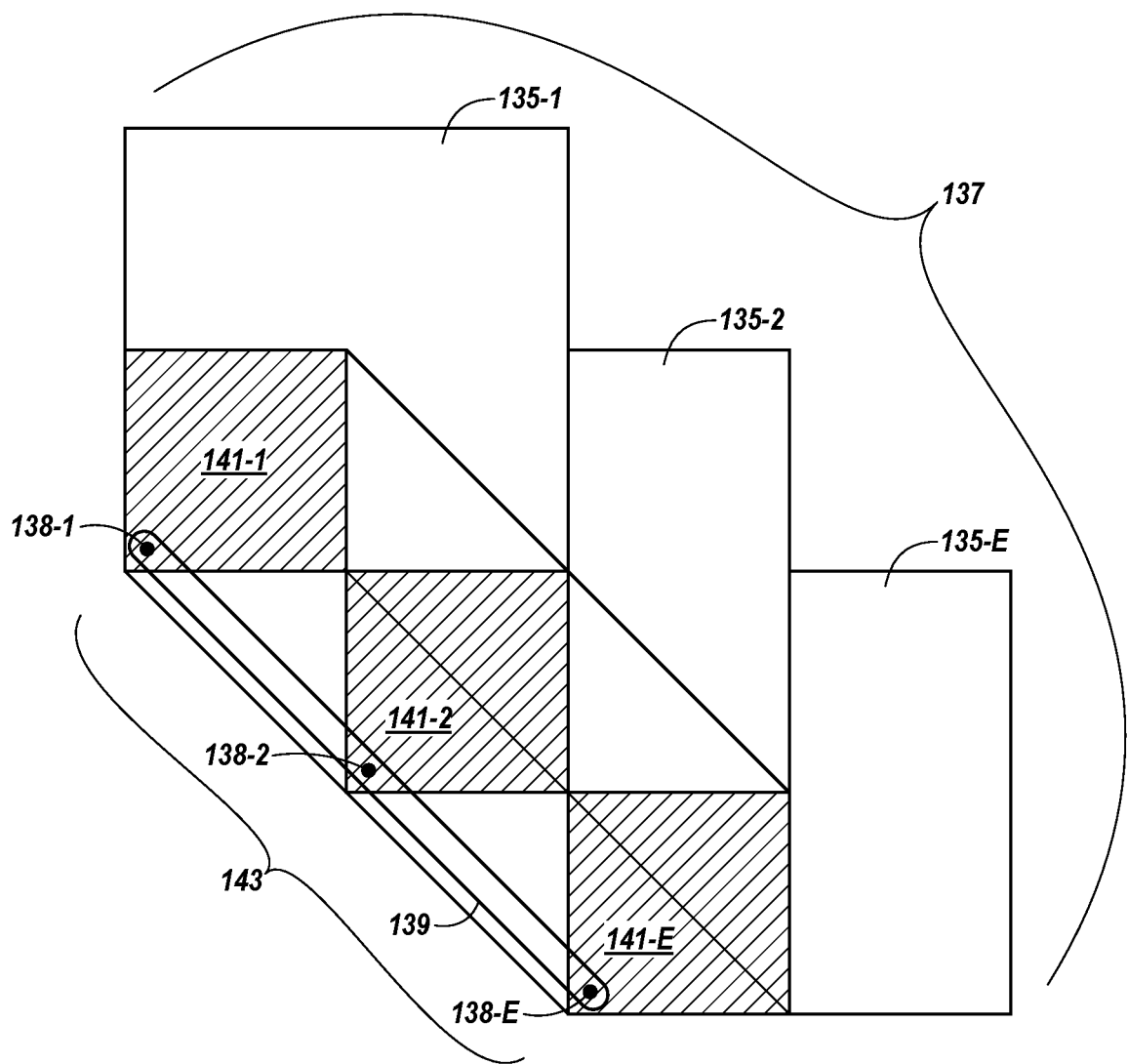
FIG. 1 illustrates a block diagram of an apparatus in the form of a memory device in accordance with an embodiment of the present disclosure.

The present disclosure includes apparatuses and methods for performing data restore operations in memory. An embodiment includes a memory, and a controller configured to perform a data restore operation on data stored in the memory using a first table and a second table stored in the controller, wherein the first table includes a current mapping of the data stored in the memory that is based on a previous assessment of previous error rates associated with the data stored in the memory, and the second table includes a new mapping of the data stored in the memory that is based on a current assessment of current error rates associated with the data stored in the memory.

Embodiments of the present disclosure can operate to continuously perform data restore operations on data stored in memory by continuously reevaluating the memory and reprogramming (e.g., rewriting) the data so that the data is always stored in the best available memory (e.g., the memory having the lowest error rate associated therewith). This can lower the overall error rate associated with the data stored in the memory, thereby ensuring that the error detection and correction capabilities (e.g. limits) of error detection and correction schemes (e.g., ECC and/or RAID schemes) utilized by the memory are not exceeded. As such, performing data restore operations in accordance with the present disclosure can increase the quality of the data stored in the memory, which may increase the lifetime of the memory and/or prevent the memory from failing.

Embodiments of the present disclosure can also ensure efficient use of the memory's resources (e.g., power, speed, and/or storage space). For example, otherwise unrelated sense operations performed on the memory can be combined into a single operation (e.g., a read-verify operation) for both error assessment (e.g., collating error distribution) and data restoration (e.g., retrieving data to be migrated). In contrast, previous approaches may split such operations into two separate sense operations to be performed on the memory, which may use additional storage space (e.g. overhead) and result in additional wear (e.g., read disturb) on the memory.

Further, the rate at which data restore operations in accordance with the present disclosure are performed can be adjustable, which in turn can result in a corresponding increase or decrease in the storage space needed for the data restore operations (e.g., an increased speed may result in a corresponding increase in overhead, and vice versa). As such, data restore operations in accordance with the present disclosure can be tailored to particular system requirements, such as, for instance, quality of service requirements.

Further, data restore operations in accordance with the present disclosure can operate in the background of the memory, independent of client (e.g., user and/or host) accesses. This may enhance the performance (e.g., quality of service) of the memory by reducing the chance that a client access will incur latency-reducing, time consuming data correction and/or restore operations. In contrast, previous approaches may rely on client accesses for error detection and/or correction, which may result in increased latency.

Further, data restore operations in accordance with the present disclosure may be fine grained. For example, if a single unreliable portion (e.g., sector) of the memory requires extensive correction and/or restoration, such as, for instance, a RAID rebuild, this memory portion may be restored entirely, thereby reducing excess client latency.

Further, data restore operations in accordance with the present disclosure can manifest updated memory mappings to reflect newly assessed memory health. For example, data restore operations in accordance with the present disclosure can continuously assess the fidelity of the memory, and adapt the data storage in the memory to reflect these assessments. In contrast, previous approaches may use time-based (e.g., zero-time based) mapping and/or data storage assessments, and/or make irreversible mapping and/or storage decisions.

Further, performing data restore operations in accordance with the present disclosure can satisfy a periodic memory refresh useful for 3D Phase Change Material and Switch (PCMS) memory. For instance, data restore operations in accordance with the present disclosure can maintain the plasticity of such memory, and therefore lower its error rates, by continually rewriting its stored data as part of the restore operation.

Further, in the context of flash memory, data restore operations in accordance with the present disclosure can satisfy the function of continuously evaluating and managing (e.g. tuning) trim settings, such as, for instance, the calibration of sense amplifiers, of the memory to reduce (e.g., minimize) errors during sense operations. In contrast, previously approaches may rely on client accesses for tuning trim settings, thereby incurring increased latency.

As used herein, "a" or "an" can refer to one or more of something, and "a plurality of" can refer to more than one of such things. For example, a memory cell can refer to one or more memory cells, and a plurality of memory cells can refer to two or more memory cells. Additionally, the designators "E" and "N", as used herein, particularly with respect to reference numerals in the drawings, indicates that one or more of the particular feature so designated can be included with an embodiment of the present disclosure.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a block diagram of an apparatus in the form of a memory device in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example.

The memory device can include three-dimensional memory entities, such as the three-dimensional memory entity 137 illustrated in FIG. 1. The three-dimensional memory entity can include a plurality of two-dimensional memory entities 135-1, 135-2, . . . , 135-E. The two-dimensional memory entities 135 can be arrays of memory elements such as memory cells, although for clarity only one respective memory element 138-1, 138-2, . . . , 138-E is illustrated for each two-dimensional memory entity 135. The two-dimensional memory entities 135 can be physical memory entities such as dice or chips that include an array of memory elements. The two-dimensional memory entities are referred to as being two-dimensional because they are of a lesser dimension than the three-dimensional memory entity 137. Although the two-dimensional memory entities 135 are three-dimensional physical objects, they are referred to as being two-dimensional because a group of two-dimensional memory entities 135 can form a memory entity of a higher dimension, which is referred to as a three-dimensional memory entity 137. The two-dimensional memory entities may include more than one planar array of memory cells.

The two-dimensional memory entities 135 are referred to as being two-dimensional because they are of a greater dimension than a memory element. The two-dimensional memory entities 135 include a plurality of memory elements arranged in at least two physical dimensions (e.g., at least one memory array). The memory elements individually can be referred to as one-dimensional memory elements (again, even though they exist as three-dimensional physical objects). A grouping of a plurality of three-dimensional memory elements 137 can be referred to as a four-dimensional memory element (not specifically illustrated in FIG. 1). A grouping of a plurality of four-dimensional memory elements can be referred to as a five-dimensional memory element, etc.

Figure 3:
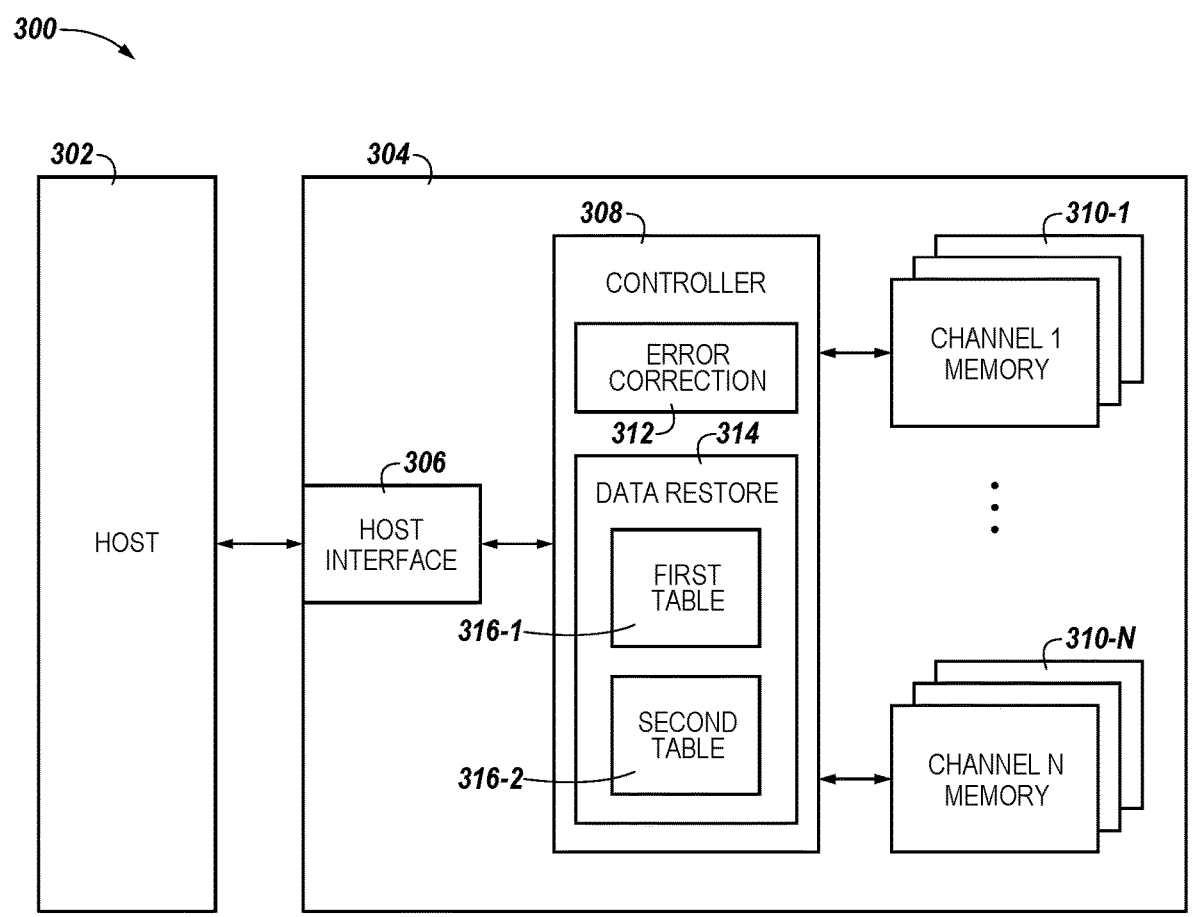
FIG. 3 illustrates a block diagram of an apparatus in the form of a computing system including at least one memory system in accordance with an embodiment of the present disclosure.

Although not specifically illustrated in FIG. 1, the memory device can be coupled to a controller, such as, for instance controller 308 further described herein in connection with FIG. 3. Controller 308 can perform data restore operations, such as, for instance, data scrubbing and/or migration operations, on data stored in the memory device, as will be further described herein.

As shown in FIG. 1, the memory device can have a first resolution 139 and a second resolution 141 associated therewith. The first resolution 139 can be referred to as a page of data. In some embodiments, the first resolution 139 can include a respective memory element 138-1, 138-2, . . . , 138-E from each two-dimensional memory entity 135-1, 135-2, ..., 135-E contained within a selected three-dimensional memory entity 137.

FIG. 1 also includes an illustration of a respective example of the second resolution 141-1, 141-2, ..., 141-E for each of the two-dimensional memory elements 135. The second resolution 141 can be a portion of a two-dimensional memory entity 135. For example, the second resolution 141-1 illustrated in association with the two-dimensional memory entity 135-1 is a portion thereof. Although the second resolution 141 is illustrated as being a quarter of the two-dimensional memory entity 135, embodiments are not limited to any particular portion.

Collectively, the portions of the two-dimensional memory entities 135 corresponding to the second resolution 141 make up a portion 143 of the three-dimensional memory entity 137. For example, in the case of 3D PCMS memory, the two-dimensional memory entities 135 can be referred to as tiles, the three dimensional memory entities 137 can be referred to as slices, the portion 143 of the three-dimensional memory entity 137 can be referred to as a parcel, and the memory elements 138 can be referred to as bits. Further, a plurality of pages of data can form a sector. For instance, a sector can be a logical construction comprising an arbitrary group of pages (e.g., the pages of data that form a sector need not be adjacent within a slice, and/or may be located on different slices). A sector may be, and/or refer to, a unit of data that is accessible to a user (e.g., a user of host 302).

The memory apparatus may include spare memory entities such as spare two-dimensional memory entities 135 and/or three-dimensional memory entities 137 (e.g., spare slices and/or spare parcels). As a non-limiting example, 1/16 of the slices on a memory die can be reserved as spares. Such a spare memory entity can include one or more pages of the memory that are not allocated to any sector of data. These spare memory entities can be used as substitutes for other memory entities that are identified as being error-prone as part of an error management and/or data restoration process, as will be further described herein.

Figure 2:
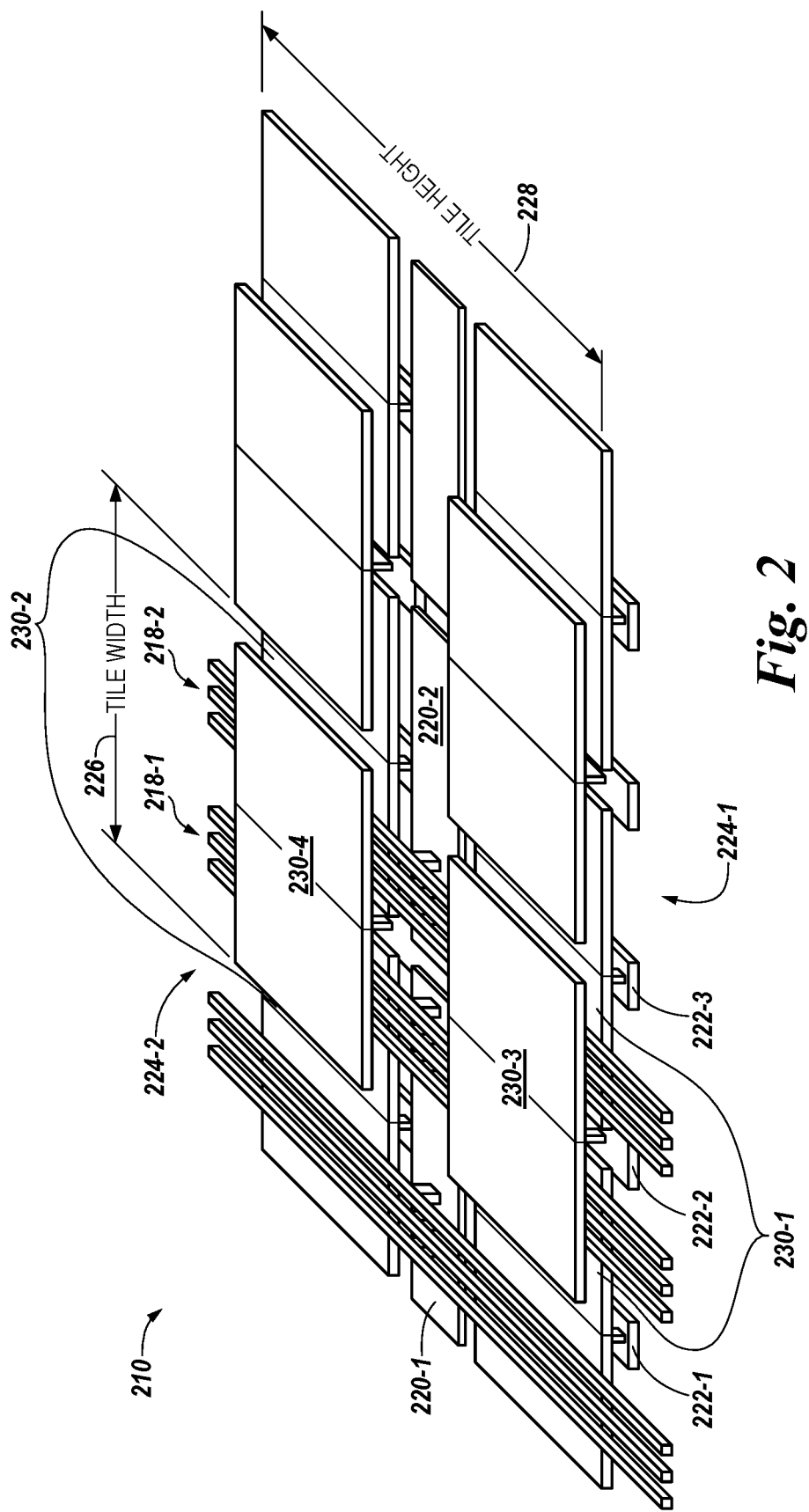
FIG. 2 illustrates a block diagram of an apparatus in the form of a memory device in accordance with an embodiment of the present disclosure.

FIG. 2 illustrates a block diagram of an apparatus in the form of a memory device 210 in accordance with an embodiment of the present disclosure. In the embodiment illustrated in FIG. 2, the memory device 210 is a 3D Phase Change Material and Switch (PCMS) memory device. A 3D PCMS memory device is an example of a multidimensional memory device.

A 3D PCMS device can include memory elements having a "stack" structure. A memory element can comprise a switch element and a storage element (e.g., a switch element coupled in series with a storage element). The switch element can be a diode, field effect transistor (FET), a bipolar junction transistor (BJT), an ovonic memory switch (OMS), or an ovonic threshold switch (OTS), among others. In an embodiment, the memory element can comprise a memory material that can serve as both the storage element and the memory element, and which may be referred to herein as a switch and storage material (SSM). An SSM may comprise a chalcogenide alloy; however, embodiments are not so limited.

In an embodiment, the switch element and storage element associated with the respective memory cells can be series coupled two-terminal devices. For instance, the switch element can be a two-terminal OTS (e.g., a chalcogenide alloy formed between a pair of electrodes), and the storage element can be a two-terminal phase change storage element (e.g., a Phase Change Material (PCM) formed between a pair of electrodes). A memory cell including an OTS in series with a PCM can be referred to as a PCMS memory cell. In an embodiment, an electrode can be shared between the switch element and storage element of the memory cells. Also, in an embodiment, memory cells can have top or bottom electrodes comprising conductive lines.

The memory device 210 can include a plurality of two-dimensional memory elements, which for the 3D PCMS memory device can be referred to as tiles. The tiles can include more than one deck (e.g., such as a lower deck 224-1 and an upper deck 224-2 as illustrated) of memory elements in an array. The tiles can have a width 226 and a height 228, as identified in the figure. The tiles can be divided into sub-tiles 230-1, 230-2, 230-3, 230-4. In an embodiment, the sub-tiles can be quarters of a tile.

Each memory element (not specifically illustrated) can be addressed by an access line and sense line combination. Access lines may also be referred to as word lines or select lines. Sense lines may also be referred to as bit lines or data lines. By way of example, a tile can include 2048 sense lines 218-1, 218-2 and 4096 access lines per deck. However, memory device 210 is not limited to a particular number of access lines 222 and/or sense lines 218. The access lines can be coupled to access line decoders 222-1, 222-2, 222-3. The sense lines can be coupled to sense line decoders 220-1, 220-2. The access line decoders 222 and the sense line decoders 220 can be coupled to a controller (not specifically illustrated), such as, for instance controller 308 further described herein in connection with FIG. 3.

FIG. 3 illustrates a block diagram of an apparatus in the form of a computing system 300 including at least one memory system 304 in accordance with an embodiment of the present disclosure. As used herein, a memory system 304, a controller 308, or a memory device 310 might also be separately considered an "apparatus." The memory system 304 can be a solid state drive (SSD), for instance, and can include a host interface 306, a controller 308 (e.g., a processor and/or other control circuitry), and one or more memory devices 310-1, ..., 310-N (e.g., solid state memory devices such as 3D PCMS memory devices), which provide a storage volume for the memory system 304.

As illustrated in FIG. 3, the controller 308 can be coupled to the host interface 306 and to the memory devices 310 via a plurality of channels and can be used to transfer data between the memory system 304 and a host 302. The interface 306 can be in the form of a standardized interface. For example, when the memory system 304 is used for data storage in a computing system 300, the interface 306 can be a serial advanced technology attachment (SATA), peripheral component interconnect express (PCIe), or a universal serial bus (USB), among other connectors and interfaces. In general, however, interface 306 can provide an interface for passing control, address, data, and other signals between the memory system 304 and a host 302 having compatible receptors for the interface 306.

Host 302 can be a host system such as a personal laptop computer, a desktop computer, a digital camera, a mobile telephone, or a memory card reader, among various other types of hosts. Host 302 can include a system motherboard and/or backplane and can include a number of memory access devices (e.g., a number of processors).

The controller 308 can communicate with the memory devices 310 to control data sense (e.g., read), program (e.g., write), and erase operations, among other operations. Although not specifically illustrated, in some embodiments, the controller 308 can include a discrete memory channel controller for each channel coupling the controller 308 to the memory devices 310. The controller 308 can include, for example, a number of components in the form of hardware and/or firmware (e.g., one or more integrated circuits) and/or software for controlling access to the number of memory devices 310 and/or for facilitating data transfer between the host 302 and memory devices 310.

The memory devices 310 can include a number of arrays of memory elements (e.g., memory cells). For example, the memory devices 310 can be 3D PCMS memory devices analogous to memory device 210 described in connection with FIG. 2, including memory elements arranged in tiles as previously described herein. However, embodiments are not limited to a particular type of memory array or array architecture.

In operation, data can be written to and/or read from a memory device of a memory system (e.g., memory devices 310 of system 304) as a physical page of data, for example. As one example, a 3D PCMS memory device may be configured to store a particular quantity of bytes of data per page, which can be one bit from each of the quantity of tiles in a slice. Data can be transferred to/from a host (e.g., host 302) in data segments referred to as sectors (e.g., host sectors). A sector of data is a logical granularity that can be remapped to a variety of different underlying system granularities.

In the embodiment illustrated in FIG. 3, controller 308 can include an error correction component 312 (e.g., an error coder such as an error correction code (ECC) engine) and a data restore component 314. Error correction component 312 and data restore component 314 can be discrete components such as an application specific integrated circuit (ASIC) or the components may reflect functionally provided by circuitry within the controller 308 that does not necessarily have a discrete physical form separate from other portions of the controller 308. Although illustrated as components within the controller 308 in FIG. 3, error correction component 312 and data restore component 314 can be external to the controller 308 or have a component located within the controller 308 and a component located external to the controller 308. For example, the error correction component 312 can include an error correction coding circuit located on the controller 308 and an error correction coding circuit located external to the controller 308. Although various functions may be described with respect to the error correction component 312 and the data restore component 314, the various functions may equally be said to be performed by the controller 308. The controller 308 can be configured to perform data restore operations, such as, for instance, data scrubbing and/or migration operations, on data stored in memory devices 310, among other operations.

As shown in FIG. 3, data restore component can include a first table 316-1 and a second table 316-2, as illustrated in FIG. 3. Tables 316-1 and 316-2 may be referred to herein as repair tables, and may be generated by controller 308 and stored (e.g., persisted) in non-volatile memory of controller 308, as will be further described herein. One of the repair tables (e.g., table 316-1), which may be referred to as the current repair table, may include (e.g., store) a current (e.g., active) mapping of the data stored in memory devices 310 that is based on a previous assessment (e.g., ranking) of previous error rates associated with the data. The other repair table (e.g., table 316-2), which may be referred to as the new repair table, may include a new (e.g., subsequent) mapping of the data that is based on a current assessment of the current error rates associated with the data.

Mapping, as used herein, can refer to the composition of a user-accessible data unit (e.g., a sector) from its constituent memory elements (e.g., pages and bits). For instance, the mappings in the repair tables may be logical to physical mappings of groups of data, such as, for instance, sectors or parcels of data, stored in memory devices 310. Examples of the repair tables, and of the data mappings included in the repair tables, will be further described herein (e.g., in connection with FIGS. 4A-4B and 5).

In an embodiment, controller 308 can perform data restore operations on data (e.g., groups of data) stored in memory devices 310 (e.g., to ensure the data is being stored in the best available memory by avoiding error-prone memory in favor of more error-resistant memory) using repair tables 316-1 and 316-2. For example, controller 308 can perform a sense operation on memory devices 310 (e.g., to sense data stored in the memory as part of a first pass of the migration) using the current data mapping in the current repair table, and then perform a program operation on memory devices 310 (e.g., to program the sensed data to the memory as part of a second pass of the migration) using the new data mapping in the new repair table.

For instance, the current data mapping in the current repair table may map the data (e.g., a group of the data) to a first physical location (e.g., address) in memory devices 310, and the new data mapping in the new repair table may map the data to a second physical location in memory devices 310. The second physical location (e.g., the location to which the sensed data is programmed) may be different from the first physical location (e.g., the location from which the data was sensed), and/or may have a lower error rate associated therewith than the first location. For instance, the first physical location may be a user-accessible location (e.g., page) in the memory and the second physical location may be a spare location (e.g., a spare page) in the memory, or vice versa.

The previous and current error rates associated with the data stored in memory devices 310 can be, for example, bit error rates associated with error correction operations performed on the data. A bit error rate, as used herein, can refer to the quantity of erroneous bits corresponding to an amount of erroneous data sensed from a memory during a sense operation divided by the total amount of data sensed during the sense operation (e.g., the sample size).

The previous and current error rates associated with the data stored in memory devices 310 can be determined using error correction component 308, and the assessments of the previous and current error rates can be performed by controller 308. For example, error correction component 308 can perform error correction operations on a plurality of groups of data stored in memory devices 310 (e.g., the data sensed during the sense operation), and determine the error rate (e.g., bit error rate) associated with the error correction operation performed on each respective group. Controller 308 can then rank the groups of data based on the error rate associated with each respective group. For instance, controller 308 can rank the groups in order from highest to lowest error rate.

Controller 308 can then generate the current repair table with mappings based on the ranking. For example, controller 308 can determine which of the groups of data are among a number of groups, that is equal to the number of spare locations in the memory, that rank the highest (e.g. have the worst error rates) in the ranking, and map these groups to the physical locations in the memory corresponding to the spare locations. The other groups of data can be mapped to physical locations in the memory corresponding to user-accessible locations. The mappings of the current repair table can then be used for initial operations (e.g. program and/or sense operations) performed on memory devices 310.

Subsequent to generating the current repair table (e.g., during subsequent operation of memory devices 310), controller 308 can perform a subsequent assessment of the error rates, and generate the new repair table based on this subsequent assessment. For example, error correction component 308 can perform subsequent error correction operations on the plurality of groups of data, and determine the subsequent (e.g., new) error rate associated with the subsequent error correction operation performed on each respective group. Controller 308 can then re-rank the groups of data based on the subsequent error rate associated with each respective group (e.g., in order from highest to lowest).

For example, controller 308 can determine which of the groups of data are among a number of groups, equal to the number of spare locations in the memory, that rank the highest (e.g. have the worst error rates) in the re-ranking, and then determine, for each of those respective highest ranking groups, whether that group is also among the number of groups that was determined to rank the highest in the original ranking. For each of these respective highest ranking groups determined to also be among the highest ranking groups in the original ranking (e.g., those groups that were originally had the worst error rates, and now still have the worst error rates), controller 308 can map these groups of data to the same physical locations in the memory to which they were mapped in the current repair table (e.g., these groups will remain mapped to the spare locations in the new table). These groups can be referred to as static groups. For each of these respective highest ranking groups that were not also among the highest ranking groups in the original ranking (e.g., those groups that were not originally among those with the worst error rates, but now are), controller 308 can map these groups of data to different physical locations in the memory than the locations that they were mapped to in the current repair table (e.g., these groups will now be mapped to the spare locations in the new table, instead of to the user-accessible locations to which they were mapped in the current table). These groups can be referred to as added groups.

Controller 308 can also determine, for each respective group of data that is not among the highest ranking groups in the re-ranking, whether that group is among the number of groups that was determined to rank highest in the original ranking. For each of these respective groups that was determined to rank highest in the original ranking (e.g., those groups that originally had the worst error rates, but now do not), controller 308 can map these groups of data to different physical locations in the memory than the locations that they were mapped to in the current repair table (e.g., these groups will now be mapped to user-accessible locations in the new table, instead of to the spare locations to which they were mapped in the current table, as they have now been displaced by the added groups). These groups can be referred to as deleted groups. For each of the respective groups that were not determined to be among the highest ranking groups in either the original ranking or the re-ranking (e.g., those groups that were never among those with the worst error rates), controller 308 can map these groups to the same physical locations in the memory to which they were mapped in the current repair table (e.g., these groups will remain mapped to the user-accessible locations in the new table).

In instances in which the spare locations in the memory all have data stored therein (e.g., are full), adding a group to the spare locations in the memory will necessitate displacing a group from the spare locations. However, the group to be displaced (e.g., the deleted group) can not simply be overwritten by the added group; otherwise, its data would be lost. Rather, the group to be displaced must first be copied out of its spare location before the added group is copied in, which can be accomplished by utilizing the two repair tables to perform the two passes of the data restore operation, as described herein.

Controller 308 can then perform a data restore operation on the data stored in memory devices 310 using the mappings of the current repair table and the new repair table, as previously described herein. Once the data restore operation has been performed, the new repair table may assume the role of, and be referred to as the current repair table, and the repair table that was the current repair table may become unused. The previously described operation cycle can then repeat itself, with controller 308 generating a newly updated mapping in the unused table space to serve as the "new" repair table.

For example, subsequent to performing the data restore operation, controller 308 can perform a new error rate assessment, and generate the updated mapping to serve as the now-new repair table based on this new assessment. For example, error correction component 308 can continue to perform error correction operations on the plurality of groups of data and determine the error rates associated with these operations. Controller 308 can then perform an additional (e.g. new) re-ranking of the groups of data based on these error rates, and generate the updated mapping for the now-new repair table (e.g., to take the place of the previous mapping of the table) based on the re-ranking, in a manner analogous to the previous ranking and repair table generation process previously described herein.

Controller 308 can then perform another data restore operation using the two repair tables, in a manner analogous to that previously described herein but with the roles of the tables reversed. This cycle can be continuously performed throughout the lifetime of memory system 304, with tables 316-1 and 316-2 alternating between the current repair table and the new repair table (e.g., alternating between being used to sense and program data) in such a manner, such that data groups (e.g., pages) with the worst error rates are continuously relegated to the spare portion of the memory.

Memory system 304 may use volatile storage for tables 316-1 and 316-2 while a newly updated mapping is being generated, but only one of the tables (e.g., the current repair table) may reside in volatile storage during intervals between data restore operations. Further, memory system 304 may use non-volatile storage for tables 316-1 and 316-2. For instance, the system may store the new (e.g., newly generated) repair table in non-volatile storage before commencing a data restore operation to protect against power loss, as will be further described herein. Further, metadata such as, for instance, a timestamp or monotonically increasing sequence number, indicating which table represents the current repair table and which table represents the new repair table may be stored in the non-volatile storage to protect against power loss.

Figure 4A:
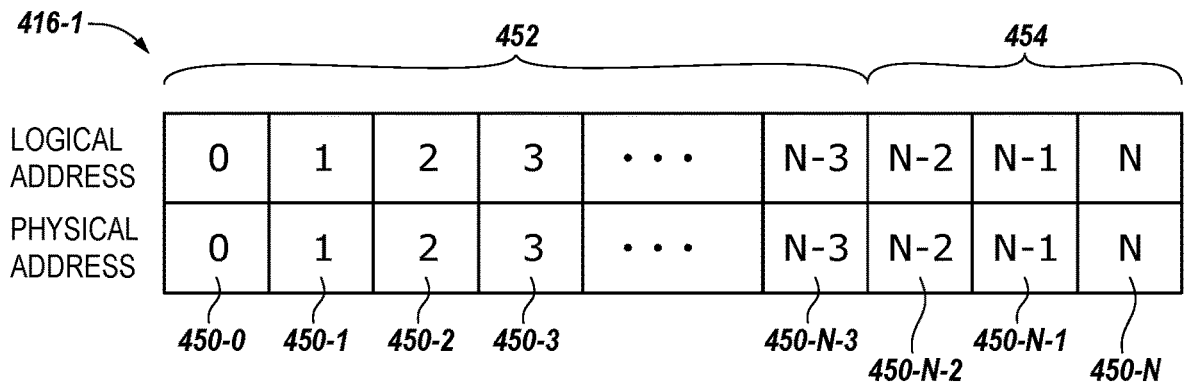
FIGS. 4A-4B illustrate examples of tables used to perform data restore operations in accordance with an embodiment of the present disclosure.
Figure 4B:
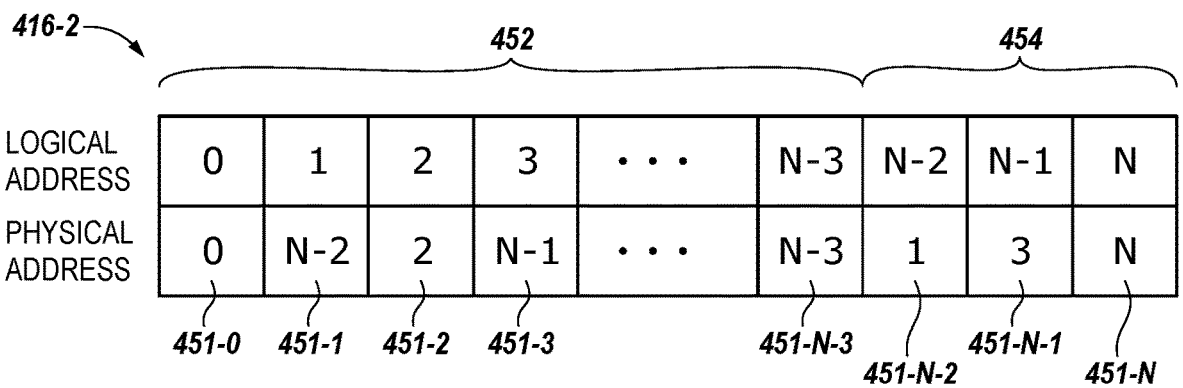

FIGS. 4A-4B illustrate examples of tables used to perform data restore operations in accordance with an embodiment of the present disclosure. For instance, table 416-1 illustrated in FIG. 4A can be an example of a current repair table previously described herein (e.g., in connection with FIG. 3), and table 416-2 illustrated in FIG. 4B can be an example of a new repair table previously described herein (e.g., in connection with FIG. 3). The examples illustrated in FIGS. 4A and 4B can be referred to as full-resolution repair tables.

As shown in FIGS. 4A-4B, tables 416-1 and 416-2 can each include a plurality of entries (e.g., elements) 450 and 451, respectively. Each respective entry can correspond to a different group (e.g., a different sector and/or parcel) of data stored in memory devices 310 previously described in connection with FIG. 3. For example, table 416-1 can include N entries, with entry 450-0 corresponding to a zeroth group of data, entry 450-1 corresponding to a first group of data, entry 450-2 corresponding to a second group of data, etc., through entry 450-N corresponding to the Nth group of data. Similarly, table 416-2 can include the same number (e.g., N) of entries, with entry 451-0 corresponding to a zeroth group of data, entry 451-1 corresponding to a first group of data, entry 451-2 corresponding to a second group of data, etc., through entry 451-N corresponding to the Nth group of data.

As shown in FIGS. 4A and 4B, each respective entry 450 and 451 in tables 416-1 and 416-2, respectively, can include a logical address and a physical address for its respective group of data. For instance, in the example illustrated in FIGS. 4A-4B, entries 450-0 and 451-0 both have the same logical address (e.g., 0) and the same physical address (e.g., 0) for group zero. Continuing in the example, entries 450-1 and 451-1 both have the same logical address (e.g., 1) for group 1, but have different physical addresses (e.g., 1 and N-2, respectively) for group 1.

As such, each respective entry 450 and 451 in tables 416-1 and 416-2, respectively, can represent a logical to physical mapping for its respective group of data. If the physical address for a particular group is the same in both tables, then that group is mapped to the same physical location by its respective entry in each table. If the physical address for a particular group is different in each table, then that group is mapped to different physical locations by its respective entry in each table. The logical address can be represented by the index of the entry, and the physical address can be represented by the content (e.g., value) of the entry.

At least one of the groups of data can include user data (e.g., data stored in a user-accessible location in the memory), and at least one of the groups of data can include spare data (e.g., data stored in a spare location in the memory). For instance, in the example illustrated in FIGS. 4A and 4B, the entries in portion 452 of tables 416-1 and 416-2 can correspond to groups of user data, and the entries in portion 454 of tables 416-1 and 416-2 can correspond to groups of spare data.

For example, FIG. 4A illustrates a full-resolution repair table 416-1 for an initial state of a memory. All groups in table 416-1 are identity mapped, with groups N-2, N-1, and N mapped to spare locations in the memory (e.g., these groups are assumed to have the worst error rates). Although these groups, which comprise portion 454, are placed at the end of table 416-1, embodiments of the present disclosure are not so limited (e.g., the groups corresponding to the spare locations may be placed anywhere in the table).

FIG. 4B illustrates an example of the repair table of FIG. 4A after a data restore operation in accordance with the present disclosure has been performed. In this example, it has been determined that groups 1, 3, and N have the worst error rates. Accordingly, the data of groups 1 and 3 are now mapped (e.g., redirected) to groups N-2 and N-1 of spare portion 454 in table 416-2, while the data of group N remains identity mapped, as illustrated in FIG. 4B. Conversely, because groups N-2 and N-1 no longer have the worst error rates, the data of those groups are now mapped to groups 1 and 3 of data portion 452 in table 416-2, as illustrated in FIG. 4B. In such a manner, the groups with the worst error rates are always located in spare portion 454 of the table.

Subsequent data accesses (e.g., during subsequent operation of the memory) may now be filtered through table 416-2. For instance, an attempt to access the data of logical group 1 would be redirected to physical group N-2, while an attempt to the data of logical group N-2 would be redirected to physical group 1.

Figure 5:
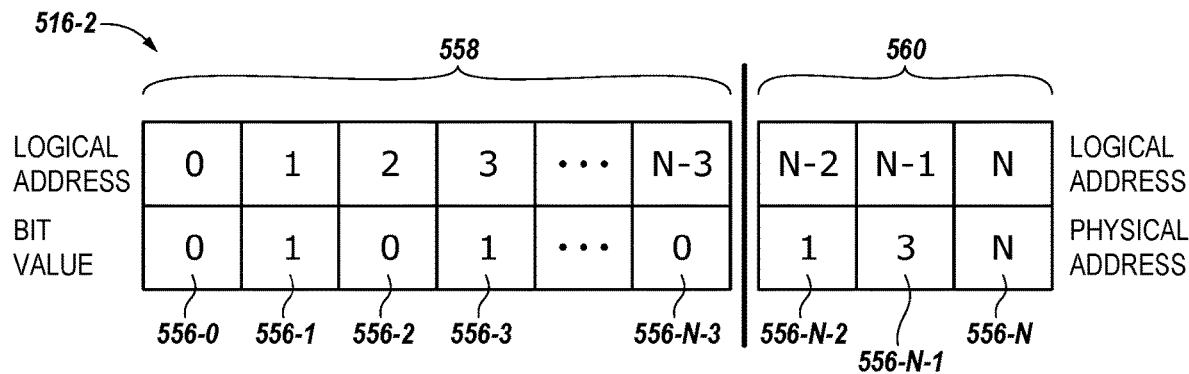
FIG. 5 illustrates an example of a table used to perform data restore operations in accordance with an embodiment of the present disclosure.

FIG. 5 illustrates an example of a table 516-2 used to perform data restore operations in accordance with an embodiment of the present disclosure. For instance, table 516-2 illustrated in FIG. 5 can be an example of a new repair table previously described herein (e.g., in connection with FIG. 3). The example illustrated in FIG. 5 can be referred to as a bitmap-based repair table.

As shown in FIG. 5, table 516-2 can include a plurality of entries (e.g., elements) 556. Each respective entry can correspond to a different group (e.g., a different sector and/or parcel) of data stored in memory devices 310 previously described in connection with FIG. 3, in a manner analogous to the entries of table 416-2 previously described in connection with FIG. 4B. Further, in a manner analogous to that previously described in connection with FIG. 4B, at least one of the groups of data can include user data, and at least one of the groups of data can include spare data. For instance, in the example illustrated in FIG. 5, the entries in portion 558 of table 516-2 can correspond to groups of user data, and the entries in portion 560 of table 516-2 can correspond to groups of spare data.

As shown in FIG. 5, each respective entry in portion 560 of table 516-2 can include a logical address and a physical address for its respective group of data, in a manner analogous to that previously described in connection with FIG. 4B. For instance, in the example illustrated in FIG. 5, entry 556-N-2 has a logical address of N-2 and a physical address 1 for group N-2, entry 556-N-1 has a logical address of N-1 and a physical address of 3 for group N-1, and entry 556-N has a logical and physical address of N for group N. As such, each respective entry in portion 560 of table 516-2 can represent a logical to physical mapping for its respective group of data, which may be a redirected mapping (e.g., to a different physical location in the memory), as previously described herein.

As shown in FIG. 5, each respective entry in portion 558 of table 516-2 can also include a logical address for its respective group of data. However, as illustrated in FIG. 5, instead of a physical address, each respective entry in this portion of the table may include a bit value (e.g., flag) indicating whether its respective group of data has been redirected to a different physical location in the memory (e.g., to a different physical address than indicated by the previous table). For instance, data portion 558 of table 516-2 may be condensed into a bitmap, with one bit per group: a zero indicating an identity mapped group, and a one indicating a redirected group, as illustrated in FIG. 5. By condensing data portion 558 of table 516-2 into a bitmap in such a manner, the size of table 516-2 may be reduced (e.g., as compared to the size of table 416-2).

For instance, in the example illustrated in FIG. 5, the bit values (e.g., 1) of entries 556-1 and 556-3 indicate that groups 1 and 3 have been redirected to different physical locations in the memory (e.g., these groups have been redirected from the data portion of the memory to the spare portion of the memory). For clarity, these redirections are identical to the redirections previously described in connection with FIG. 4B.

Subsequent data accesses (e.g., during subsequent operation of the memory) may now be filtered through table 516-2, and accesses of redirected data groups may include a search of spare portion 560 to locate the redirected data. For example, an attempt to access the data of logical group 3 would encounter a set (e.g., 1) bit value in the bitmap of table 516-2. This would trigger a lookup in spare portion 560 for the value "3", which would be found at group N-1, and accordingly the access would target this physical address. In contrast, an attempt to access the data of logical group 0 would encounter a clear (e.g., 0) bit value in the bitmap, and would therefore proceed to access physical group 0 with no additional lookup needed.

Figure 6:
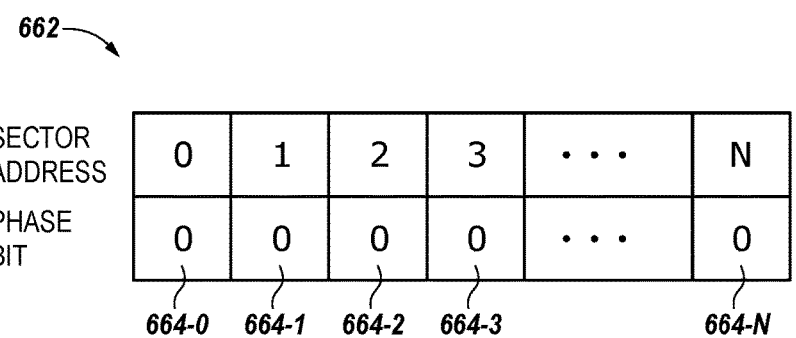
FIG. 6 illustrates an example of a table used in operation of memory in accordance with an embodiment of the present disclosure.

FIG. 6 illustrates an example of a table 662 used in operation of memory in accordance with an embodiment of the present disclosure. For instance, table 662 may be used in conjunction with tables 316-1 and 316-2 previously described in connection with FIG. 3, for determining which of these tables should be used during program and/or sense operations performed on the memory, such as, for instance, program and/or sense operations performed during data restore operations. Table 662 may be stored, for example, in volatile memory (e.g., RAM or DRAM) external to memory devices 310 previously described in connection with FIG. 3.

Table 662 can be a bitmap whose constituent bits are each associated with a single group (e.g., sector) in memory devices 310. For example, as shown in FIG. 6, table 662 can include a plurality of entries (e.g., elements) 664. Each respective entry can correspond to a different group (e.g., a different sector) of data stored in memory devices 310 previously described in connection with FIG. 3, and can include a phase bit associated with that respective group, as illustrated in FIG. 6. That is, each group can have a phase bit associated therewith.

As previously described herein, tables 316-1 and 316-2 can alternate between being the current repair table and the new repair table (e.g., their respective mappings can alternate between being the mapping used for program and sense operations). Which of these tables (e.g., which table's mapping) should be used when programming data to, or sensing data stored in, a group of data can be determined based on (e.g., indicated by) the value of that group's phase bit in table 662. For example, when the phase bit associated with a group is clear (e.g., 0), the first table (e.g., table 316-1) should be used when programming data to, or sensing data stored in, that group, and when the phase bit associated with a sector is set (e.g., 1), the second table (e.g., table 316-2 should be used. All phase bits in table 662 can be cleared to 0 upon initialization and/or power up of the memory.

Figure 7:
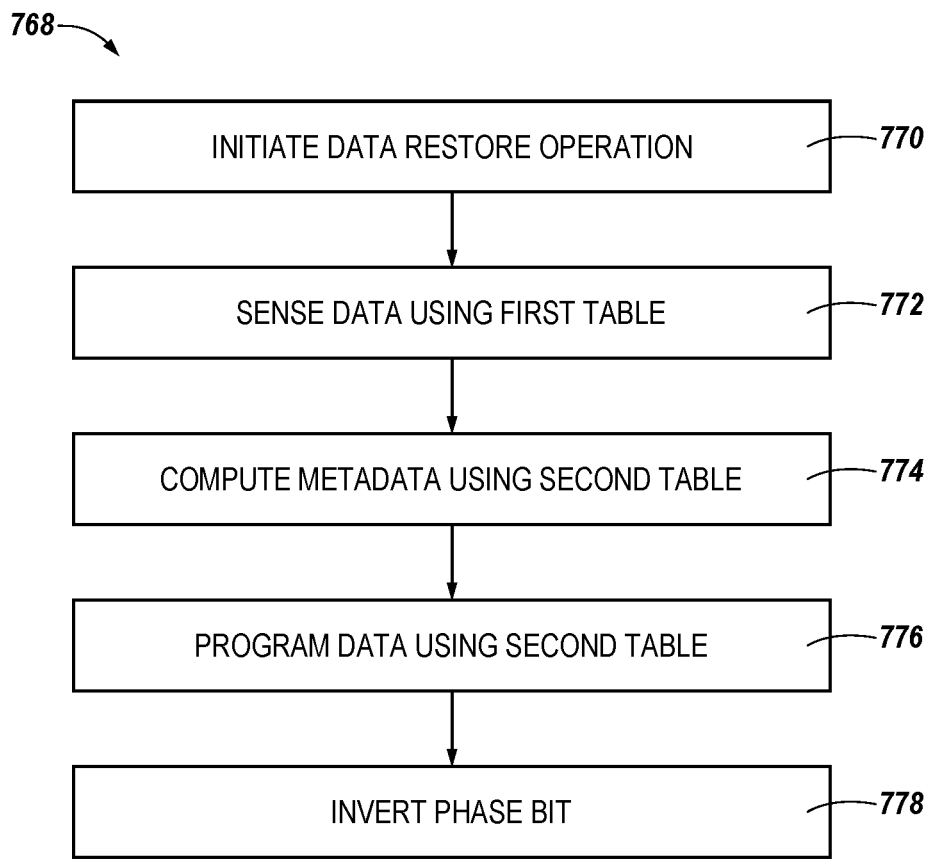
FIG. 7 illustrates a method for operating memory in accordance with an embodiment of the present disclosure.

FIG. 7 illustrates a method 768 for operating memory, such as, for instance, memory devices 310 previously described in connection with FIG. 3, in accordance with an embodiment of the present disclosure. Method 768 can be performed using, for example, controller 308 previously described in connection with FIG. 3, and may be performed atomically with respect to other concurrent operations (e.g. client accesses) being performed on the memory.

At block 770, method 768 includes initiating a data restore (e.g., migration) operation to be performed on a group (e.g., sector) of data stored in the memory. At block 772, method 768 includes sensing (e.g., reading) the data stored in that group using a first one of tables 316-1 and 316-2 previously described in connection with FIG. 3 (e.g. using the mapping of that table). The table used to sense the data can be the table that is presently serving as the current repair table. The determination of which table to use to sense the data (e.g., which table is the current repair table) can be made based on the value of the phase bit associated with that group of data, as previously described in connection with FIG. 6. In an embodiment, the data may be sensed into a buffer.

At block 774, method 768 includes computing metadata using a second (e.g., the other) one of tables 316-1 and 316-2 (e.g., the table not indicated to be the current repair table by the phase bit associated with that group). The metadata may include, for instance, metadata spare encodings for the group of data. For example, designated spare bits in that group's space (e.g., footprint) in the memory may be populated with replicated data from groups previously determined to have the worst error rates, and accordingly the data stored in the group may change due to a changing error rate within the group (e.g., within the slices of the group), even if that group's data remains static. The metadata may also include, for example, a representation of the phase bit associated with the group, for use if power-loss occurs during the data restore operation.

At block 776, method 768 includes programming (e.g., writing) the data that was stored in the group (e.g., the data sensed at block 772) to the memory using the second table (e.g., using the table presently serving as the new repair table). That is, the determination of which table to use to program the data (e.g., which table is the current repair table) can also be made based on the value of the phase bit associated with that group of data, as previously described in connection with FIG. 6.

The location in the memory to which the data is programmed may be a different physical location in the memory, such as a location (e.g., page) having a lower error rate than the error rate of the group from which the data was sensed, as previously described herein. As such, the data can be redirected from a group having a higher error rate to a group having a lower error rate, as previously described herein. At block 778 (e.g., upon the data being programmed to the memory), method 768 can include inverting the value of the phase bit associated with the group from which the data was sensed.

Figure 8:
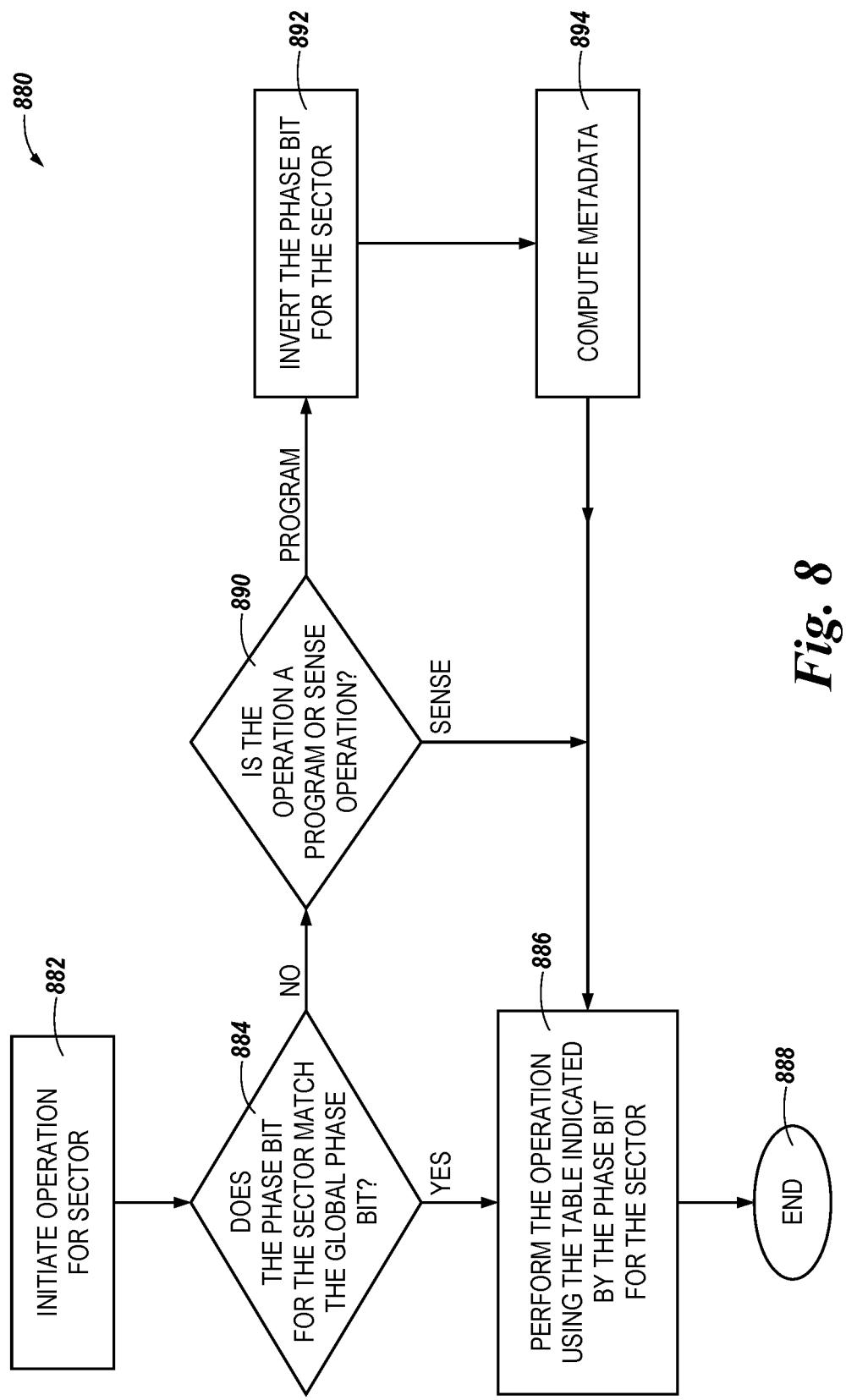
FIG. 8 illustrates a method for operating memory in accordance with an embodiment of the present disclosure.

FIG. 8 illustrates a method 880 for operating memory, such as, for instance, memory devices 310 previously described in connection with FIG. 3, in accordance with an embodiment of the present disclosure. Method 880 can be performed using, for example, controller 308 previously described in connection with FIG. 3, and can be part of (e.g., provide rules for) program and/or sense operations being performed on a group (e.g., sector) of data stored in the memory during data restore operations or client accesses.

At block 882, method 880 includes initiating a program or sense operation to be performed on a group (e.g., sector) of data stored in the memory. Although not shown in FIG. 8, if the program or sense operation is initiated as part of a data restore operation being performed on the sector, then the value of a global phase bit associated with the memory (e.g., a single phase bit that is associated with the entire memory) can be inverted, such that the inverted value of the global phase bit does not match the value of the phase bit associated with the sector. If the program or sense operation is not initiated as part of a data restore operation (e.g., the operation is part of a normal client access), then the value of the global phase bit is not inverted, and accordingly matches the value of the phase bit associated with the sector. Accordingly, the value of the global phase bit can indicate whether a data restore operation is currently being performed.

At block 884, method 880 includes determining whether the value of the phase bit for the sector matches the value of the global phase bit. The value of the phase bit associated with the sector can be provided, for instance, by table 662 previously described in connection with FIG. 6.

If it is determined that the phase bit value for the sector matches the global phase bit value (e.g., indicating the program or sense operation has been initiated as part of a client access), then the program or sense operation can be performed at block 886 using the appropriate repair table (e.g. the mapping of that table) based on (e.g., indicated by) the value of the phase bit for the sector, and method 880 can end at block 888. Accordingly, for program and sense operations initiated as part of a client access, the operation will use the repair table indicated by the value of the sector's phase bit regardless of the value of the global phase bit.

If it is determined that the phase bit value for the sector does not match the global phase bit value, then it is determined at block 890 whether the operation initiated at block 882 is a program operation or a sense operation. If the operation is a sense operation, then the sense operation can be performed at block 886 using the appropriate repair table (e.g. the mapping of that table) based on (e.g., indicated by) the value of the phase bit for the sector, and method 880 can end at block 888. Accordingly, for sense operations initiated as part of a data restore (e.g., migration) operation, and if the sector's phase bit does not match the global phase bit subsequent to the inversion of the global phase bit, the operation will use the repair table indicated by the value of the sector's phase bit.

If the operation initiated at block 882 is a program operation, then the value of the phase bit for the sector can be inverted at block 892, and metadata for the sector can be computed based on the inverted phase bit value at block 894. The metadata may include, for instance, metadata spare encodings for the sector of data, and can be computed in a manner analogous to that previously described in connection with FIG. 7. The program operation can then be performed at block 886 using the appropriate repair table (e.g. the mapping of that table) based on (e.g., indicated by) the inverted value of the phase bit for the sector, and method 880 can end at block 888. Accordingly, for program operations initiated as part of a data restore (e.g., migration) operation, and if the sector's phase bit does not match the global phase bit subsequent to the inversion of the global phase bit, the operation will first invert the value of the sector's phase bit, and then encode the metadata spare and perform the programming using the repair table indicated by the now-inverted value of the sector's phase bit.

Although not shown in FIG. 8, if a power loss occurs while a data restore operation is being performed on the memory, the present value of the global phase bit and the logical address for the sector of the memory on which the data restore operation has been most recently performed can be rapidly stored (e.g., persisted) to non-volatile memory (e.g., the same non-volatile memory in which the repair tables are persisted) upon detecting the occurrence of the power loss. Upon power (e.g., and the repair tables) subsequently being restored, the value of the phase bit associated with each respective sector of the memory having a logical address less than or equal to the stored logical address (e.g., less than or equal to the logical address for the sector on which the data restore operation was most recently performed before the power loss) can be set to the value of the global phase bit, and the value of the phase bit associated with the other sectors (e.g., each respective sector having a logical address greater than the stored logical address) can be set to the inverted value of the global phase bit. Accordingly, the data restore operation can resume at the sector where it was when the power loss occurred.

Figure 9:
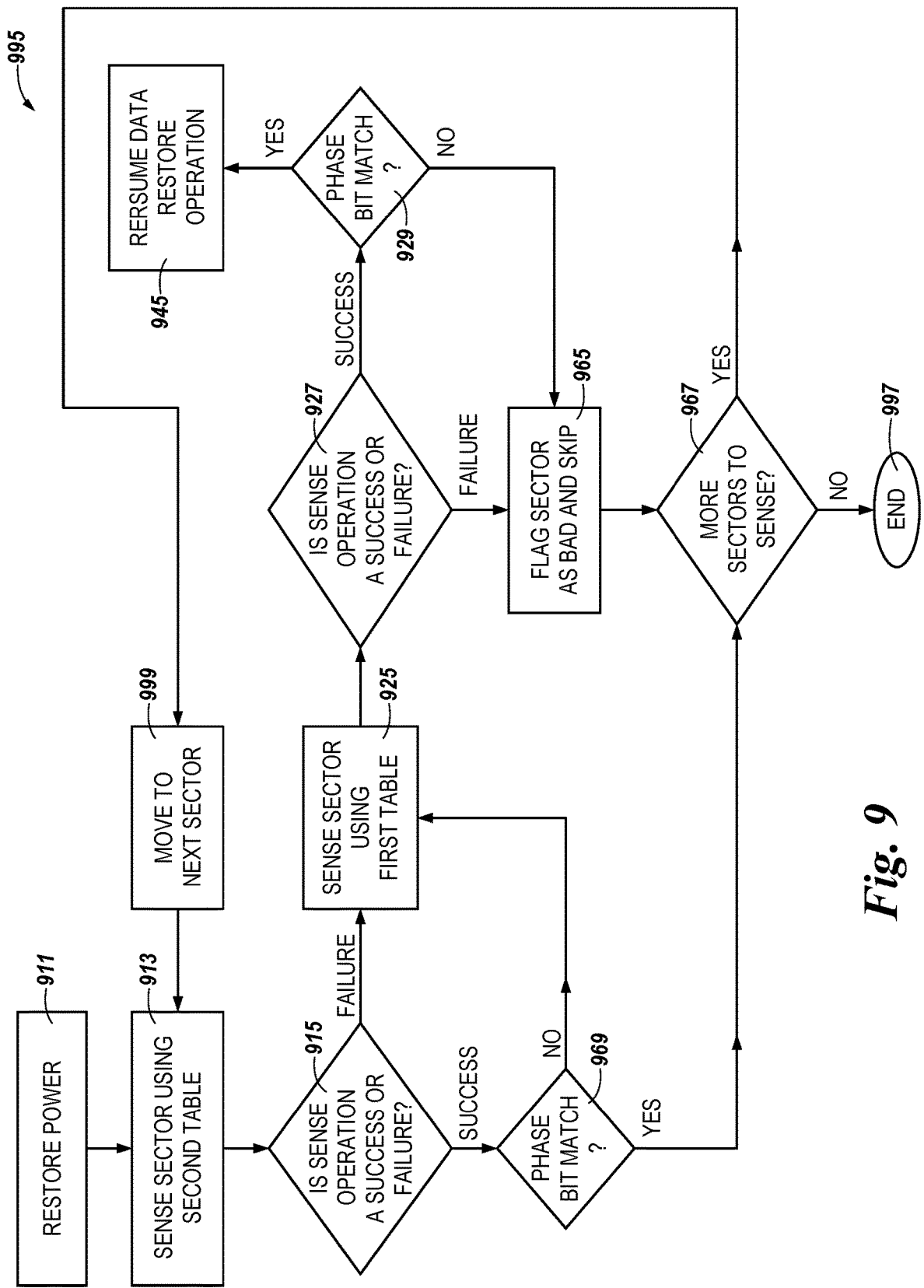
FIG. 9 illustrates a method for operating memory in accordance with an embodiment of the present disclosure.

FIG. 9 illustrates a method 995 for operating memory, such as, for instance, memory devices 310 previously described in connection with FIG. 3, in accordance with an embodiment of the present disclosure. Method 995 can be performed using, for example, controller 308 previously described in connection with FIG. 3.

Method 995 can be a method to resume a data restore operation being performed on the memory if a power loss occurs and no extra information (e.g., the global phase bit value and sector logical address as described in connection with FIG. 8) is persisted during the power loss. For example, upon power being restored subsequent to the power loss, sequential sense operations can be performed on the groups (e.g., sectors) of data stored in the memory (e.g., in the same sequential order in which the data restore operation is performed) to sequentially (e.g. one at a time) sense each respective sector using the new mappings of the second table (e.g., using the mappings of the table presently serving as the new repair table). Upon one of these sense operations failing, a sense operation to sense that respective sector of data can be performed using the current mappings of the first table (e.g. using the mappings of the table presently serving as the current repair table), and if that sense operation is successful, that indicates the sector where the data restore operation was when the power loss occurred, and accordingly the data restore operation can be resumed at that sector.

For example, upon power being restored at block 911, method 995 includes performing, at block 913, a sense operation to sense the first sector of data in the sequence using the mapping for that sector in the second (e.g., new) repair table, and determining, at block 915, whether that sense operation is a success or failure. Whether the sense operation is a success or failure can be determined, for example, based on the number of errors that occur during the sense operation and/or whether the errors are correctable (e.g., the sense operation may fail if the number of errors exceeds the error correction capabilities of the memory, as previously described herein).

If the sense operation is a success, then it is determined at block 969 whether the value of the phase bit associated with the first sector matches the value of the global phase bit. The value of the phase bit associated with the sector can be provided, for instance, by table 662 previously described in connection with FIG. 6, and the global phase bit can be the global phase bit previously described in connection with FIG. 8.

If the sense operation performed at block 913 is determined to be a success at block 915, and the values of the sector phase bit and the global phase bit are determined to match at block 969, it can be assumed that the first sector was successfully migrated before the power loss occurred and the sequence can move on to the next sector. For instance, at block 967 it can be determined whether there more sectors of data to sense, and if there are more sectors to sense, method 995 can move to the next (e.g., second) sector of data in the sequence at block 999, and proceed to sense that sector using the second table at block 913. If it is determined at block 967 that there are no more sectors to sense (e.g., that the sequence has been performed on all data sectors), it can be assumed that all the sectors have been successfully migrated, and method 995 can end at block 997.

If the sense operation performed at block 913 is determined to be a failure at block 915, or if the values of the sector phase bit and the global phase bit are determined to not match at block 969, it can be assumed that the first sector of data has not yet been successfully migrated. Accordingly, a sense operation can be performed at block 925 to sense the first sector using the mapping for that sector in the first (e.g., current) repair table, and it can be determined at block 927 whether that sense operation is a success or failure.

If the sense operation performed at block 925 (e.g., using the current repair table) is a success, then it is determined at block 929 whether the value of the phase bit associated with the first sector matches the value of the global phase bit. If these phase bit values match, it can be assumed that the sector at which the data restore operation was when the power loss occurred has been located, and accordingly the data restore operation can be resumed at that sector (e.g. the first sector) at block 945. Further, although not shown in FIG. 9, the phase bits for all sectors in the sequence preceding that sector can be set to the set value (e.g., 1), and the phase bits for all succeeding sectors in the sequence can be set to the cleared value (e.g., 0).

If the sense operation performed at block 925 is determined to be a failure at block 927, or if the values of the sector phase bit and the global phase bit are determined to not match at block 929 (e.g., if the first sector can not be successfully sensed using either repair table), it can be assumed that this sector's data has been lost. Accordingly, that sector can be flagged as bad at block 965 so that it is skipped in the sequence, and method 995 can move to the next sector in the sequence (e.g., determine whether there more sectors of data to sense at block 967, move to the next sector of data in the sequence at block 999, and proceed to sense that sector using the second table at block 913).

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
a controller configured to:
perform a data restore operation on data stored in the memory using a first table and a second table stored in the controller, wherein:
the first table includes a current mapping of the data stored in the memory that is based on a previous assessment of previous error rates associated with the data stored in the memory; and
the second table includes a new mapping of the data stored in the memory that is based on a current assessment of current error rates associated with the data stored in the memory; and
invert a value of a global phase bit associated with the memory upon initiating the performance of the data restore operation, such that the inverted value of the global phase bit does not match a value of a phase bit associated with the data stored in the memory.

2. The apparatus of claim 1, wherein the controller is configured to perform the data restore operation on the data stored in the memory by:
performing a sense operation on the memory using the current mapping of the data included in the first table; and
performing a program operation on the memory using the new mapping of the data included in the second table.

3. The apparatus of claim 1, wherein:
the current mapping of the data included in the first table includes a mapping of the data to a first physical location in the memory; and
the new mapping of the data included in the second table includes a mapping of the data to a second physical location in the memory that is different than the first physical location.

4. The apparatus of claim 3, wherein the second physical location has a lower error rate associated therewith than the first physical location.

5. The apparatus of claim 3, wherein the second physical location is a spare location in the memory.

6. The apparatus of claim 1, wherein the first table and the second table are stored in non-volatile memory of the controller.

7. The apparatus of claim 1, further comprising the controller configured to:
determine to use the current mapping to sense the data stored in the memory based on a value of the phase bit associated with the data stored in the memory; and
determine to use the new mapping to program the sensed data to the memory based on the value of the phase bit.

8. An apparatus, comprising:
a memory; and
a controller configured to:
rank groups of data stored in the memory based on a first error rate associated with each respective group;
generate a first table that includes a mapping of the groups of data that is based on the ranking;
re-rank the groups of data based on a second error rate associated with each respective group determined subsequent to generating the first table;
generate a second table that includes a mapping of the groups of data that is based on the re-ranking;
perform a data restore operation on the groups of data;
perform an additional re-ranking of the groups of data based on a third error rate associated with each respective group determined subsequent to performing the data restore operation;
update the mapping of the groups of data in the first table based on the additional re-ranking; and
perform an additional data restore operation on the groups of data based on the updated mapping, wherein
the first table and the second table each include a plurality of entries, wherein each respective entry corresponds to a different one of the plurality of groups of data; and each respective entry includes:
- a logical address for its respective group of data; and
- a physical address for its respective group of data.

9. The apparatus of claim 8, further comprising the controller configured to determine the first error rate, the second error rate, and the third error rate.

10. The apparatus of claim 8, further comprising the controller configured to:
- sense each respective group of data using the mapping of the second table; and
- program the sensed data to the memory using the updated mapping of the first table.

11. The apparatus of claim 10, further comprising the controller configured to program the sensed data to a physical location in the memory that is different from a physical location in the memory from which the data is sensed and has a lower error rate associated therewith than the physical location in the memory from which the data is sensed.

12. The apparatus of claim 10, further comprising the controller configured to:
- determine to use the mapping of the second table to sense each respective group of data based on a value of a phase bit associated with the data stored in the memory; and
- determine to use the updated mapping to program the sensed data to the memory based on the value of the phase bit.

13. The apparatus of claim 8, further comprising the controller configured to perform sequential sense operations to sequentially sense each respective group of data using the mapping of the groups of data included in the second table.

14. The apparatus of claim 13, wherein the entry in the second table corresponding to a particular one of the groups of data includes:
- a same logical address as the logical address for that group in the entry in the first table corresponding to that group; and
- a different physical address than the physical address for that group in the entry in the first table corresponding to that group.

15. A method for operating memory, comprising:
performing a data restore operation on data stored in a memory by:
- sensing the data stored in the memory using a first mapping of the data, wherein:
  - the first mapping is a current mapping of the data stored in the memory that is based on a previous assessment of previous error rates associated with the data; and
  - the first mapping is stored in a first table; and
- programming the sensed data to the memory using a second mapping of the data, wherein:
  - the second mapping is new mapping of the data stored in the memory that is based on a current assessment of current error rates associated with the data; and
  - the second mapping is stored in a second table;
- detecting a power loss while performing the data restore operation; and
- storing, upon detecting the power loss, a value of a phase bit and a logical address for the data stored in the memory upon which the data restore operation has most recently been performed.

16. The method of claim 15, further comprising inverting the value of the phase bit associated with the data store in memory upon programming the sensed data to the memory.

17. The method of claim 15, further comprising:
- performing sequential sense operations to sequentially sense portions of the data using the second mapping; and
- performing, upon the sense operation to sense a portion of the data failing, a sense operation to sense that portion of the data using the first mapping; and
- resuming the data restore operation upon the sense operation to sense that portion of the data using the first mapping succeeding.

* * * * *